(12) United States Patent
Staples

(10) Patent No.: US 12,037,073 B2
(45) Date of Patent: Jul. 16, 2024

(54) CONTROL DEVICE AND LEVER PAD FOR THE SAME

(71) Applicant: D3 Innovation Inc., Squamish (CA)

(72) Inventor: Jonathan Staples, Garibaldi Highlands (CA)

(73) Assignee: D3 Innovation Inc., Squamish (CA)

( * ) Notice: Subject to any disclaimer, the term of this patent is extended or adjusted under 35 U.S.C. 154(b) by 0 days.

(21) Appl. No.: 18/066,091

(22) Filed: Dec. 14, 2022

(65) Prior Publication Data

US 2023/0182853 A1 Jun. 15, 2023

Related U.S. Application Data (60) Provisional application No. 63/289,624, filed on Dec. 14, 2021.

(51) Int. Cl.
*B62K 23/06* (2006.01)
*F16C 1/14* (2006.01)

(52) U.S. Cl.
CPC .............. *B62K 23/06* (2013.01); *F16C 1/14* (2013.01)

(58) Field of Classification Search
None
See application file for complete search history.

(56) References Cited

U.S. PATENT DOCUMENTS

| | | |
|---|---|---|
| 9,533,571 B1 | 1/2017 | Urmosi |
| 10,473,143 B2 | 11/2019 | Basiliere |
| 2004/0173045 A1 * | 9/2004 | Hancock ................ B62K 23/06 74/544 |
| 2019/0100273 A1 | 4/2019 | Miyazaki |
| 2021/0245831 A1 * | 8/2021 | Anspach ................ B62K 23/06 |

FOREIGN PATENT DOCUMENTS

FR 2621372 A1 * 4/1989

OTHER PUBLICATIONS

PNW Components Loam Lever Gen 2 product manual, available from https://www.pnwcomponents.com/pages/manual-page-loam-lever-gen-2.
Gerow, "Quick Question: How Can I Keep the Derailleur Cable Ferrule From Falling Off?" online article, dated Feb. 17, 2021, availble from https://www.singletracks.com/mtb-gear/quick-question-how-can-i-keep-the-derailleur-cable-ferrule-from-falling-off/.

* cited by examiner

Primary Examiner — Vicky A Johnson
(74) Attorney, Agent, or Firm — Marks & Clerk (57) ABSTRACT

A control device for an actuation cable on a bicycle is provided. The control device comprises: a frame for securing the control device to the bicycle; and a lever arm assembly rotatably coupled to the frame and moveable between a first position and a second position, the lever arm assembly comprising: a lever arm rotatable coupled to the frame at a pivot point; a cable lock for fixing the actuation cable to the lever arm, the cable lock demarcating a working segment of the actuation cable from a tail of the actuation cable when the actuation cable is fixed to the lever arm; and a cable catch configured to removably retain at least a portion of the tail of the actuation cable.

20 Claims, 9 Drawing Sheets

CONTROL DEVICE AND LEVER PAD FOR THE SAME

CROSS-REFERENCE TO RELATED APPLICATION

This application claims the benefit of, and priority to, U.S. provisional appn. No. 63/289,624, filed Dec. 14, 2021 and entitled Bicycle Actuation Lever, the entirety of which is incorporated herein by reference.

TECHNICAL FIELD

The present disclosure generally relates to control devices and, more particularly, to a control device for manipulating movement of an actuation cable on a bicycle. The present disclosure further relates to lever pads for such control devices.

BACKGROUND

Bicycles commonly include mechanisms that can be difficult to manipulate directly, particularly when users are riding their bicycles. Such mechanisms can include dropper seat posts, gear shifters, and the like. In such instances, a control device is generally used to actuate the mechanism at a distance.

A common type of control device pulls on an actuation cable that is connected between the control device and the mechanism. This pulling motion is transmitted by the actuation cable from the control device to the mechanism, which in turn actuates the mechanism. By mounting the control device at a convenient location away from the mechanism, such as on a handlebar of a bicycle, a user can readily manipulate the control device to actuate the mechanism remotely. In this way, the user can safely actuate the mechanism at a distance, even when riding the bicycle.

While the contributions of existing control devices are laudable, improvement and alternatives are generally desired.

SUMMARY

The following summary is provided to introduce a selection of concepts in a simplified form, which are further described below in the detailed description of embodiments. The aspects and embodiments set out in this summary are meant to be exemplary and illustrative, not limiting in scope. Nothing in this summary is intended to limit the scope of the claimed subject-matter. As will be appreciated, the terms "aspect" and "embodiment" are used interchangeably herein.

In an aspect of the present disclosure, there is provided a control device for an actuation cable on a bicycle, the control device that includes a frame for securing the control device to the bicycle. A lever arm assembly may be rotatably coupled to the frame and moveable between a first position and a second position. The lever arm assembly may include a lever arm rotatable coupled to the frame at a pivot point and a cable lock for fixing the actuation cable to the lever arm. The cable lock may demarcate a working segment of the actuation cable from a tail of the actuation cable when the actuation cable is fixed to the lever arm. A cable catch may be configured to removably retain at least a portion of the tail of the actuation cable.

The lever arm assembly may include a user facing side and a rear side opposite the user facing side. The cable catch may be located on the rear side of the lever arm assembly.

The user facing side may include a pressing face positioned so as to be pressable by a user when the control device is secured to the bicycle to move the lever arm assembly from the first position toward the second position. The cable catch may be optionally located directly opposite the pressing face and within a projection of an area of the pressing face in a rearward direction.

The lever arm assembly may include a cable path configured to guide the actuation cable and which the actuation cable follows when fixed to the lever arm and received in the cable catch. The cable catch may include a recess that extends along an axial direction of the cable path.

The recess may be a slot that is configured to pressably receive the tail of the actuation cable in a depthwise direction that is generally perpendicular to the axial direction of the cable path. The slot may include a base, opposing first and second inner surfaces extending rearwardly from the base and an open side to receive the tail of the actuation cable in the depthwise direction so that the tail of the actuation cable is positionable between and engaged by the opposing first and second inner surfaces.

The cable catch may include a tip concealing region that is located after the recess along the cable path and comprises an axially extending cavity having a first end that is adjacent the recess and that is at least partially bounded by a base portion and a cover portion that is rearwardly spaced apart from base portion in the depthwise direction and overlies the base portion so that the cavity is configured to slidably receive, in the axial direction, a distal tip of the tail of the actuation cable so that the distal tip is disposed between the base portion and the cover portion.

The cover portion may include a tip shield that is positioned to at least partially cover the distal tip of the tail of the actuation cable in the depthwise direction when received in the tip concealing region thereby inhibiting contact between a user and the distal tip and inhibiting removal of the distal tip from the tip concealing region in the depthwise direction.

The axially extending cavity may include a terminal end that is axially spaced from the first end along the cable path and optionally wherein the terminal end of the cavity is at least partially bounded by the base portion and the cover portion and the lever arm, and optionally the open terminal end of the cavity may be disposed inboard of the first end of the cavity.

The cable catch may be integrally formed with the lever arm.

The lever arm assembly may include a lever pad that includes a body, a neck, and a head, wherein the neck extends through a pad opening in the lever arm, wherein the body and the head securely extend from opposite ends of the neck and are wider than the pad opening to secure the lever pad to the lever arm, and wherein the head is positioned on the rearward side of the pad opening and comprises the cable catch, and optionally wherein the cable catch is integrally formed with the head, and optionally wherein the lever pad is removable from the a lever arm and wherein the cable catch is removable from the lever arm with the lever pad.

The head may be formed from a resiliently compressible material and is compressible in at least one direction such that the head can be compressed by moving a first inner surface of the cable catch toward a second inner surface of the cable catch to be pressably inserted through the pad opening when securing the lever pad to the lever arm and in order to remove the lever pad from the lever arm, and wherein when the tail of the actuation cable is received within the cable catch the tail is disposed between the first inner surface and the second inner surface thereby resisting compression of the head and inhibiting removal of the head through the pad opening.

The cable catch may extend into the neck of the lever pad.

The cable catch may allow access to the tail of the actuation cable when received therein, to permit selective removal of the tail from the cable catch without disassembling the lever arm assembly.

The cable catch may be spaced apart from the cable lock.

In accordance with another broad aspect of the teachings described herein, a lever pad for securing to a lever arm of a control device may include a neck sized to extend through a pad opening in the lever arm, a body that is wider than the neck and securely extends from a pressing end of the neck and comprises an outward facing pressing face configured to be positioned on a user facing side of the lever arm and pressable by a user when the lever pad is secured to the lever arm; and a head that is wider than the neck and securely extends from a rear end of the neck, opposite the pressing end and is configured to pass through the pad opening in the lever arm when attaching or detaching the lever pad from the lever arm, the head comprising a cable catch configured to removably receive at least a portion of a tail of an actuation cable.

The cable catch may include a cable path, which the tail of the actuation cable follows when received in the cable catch, and wherein the cable catch comprises a recess that extends along an axial direction of the cable path and may be configured to pressably receive the tail of the actuation cable in a depthwise direction that is generally perpendicular to the axial direction of the cable path.

The recess may be a slot comprising a base, opposing first and second inner surfaces extending from the base and an open side to receive the tail of the actuation cable in the depthwise direction so that the tail of the actuation cable is positionable between and engaged by the opposing first and second surfaces.

The cable catch may include a tip concealing region that is located after the recess along the cable path and comprises an axially extending cavity having a first end that is adjacent the recess and that is at least partially bounded by a base portion and a cover portion that is rearwardly spaced apart from base portion in the depthwise direction and overlies the base portion so that the cavity is configured to slidably receive, in the axial direction, a distal tip of the tail of the actuation cable so that the distal tip is disposed between the base portion and the cover portion. The cover portion may include a tip shield that is positioned to at least partially cover the distal tip of the tail of the actuation cable in the depthwise direction when received in the tip concealing region thereby inhibiting contact between a user and the distal tip and inhibiting removal of the distal tip from the tip concealing region in the depthwise direction.

At least the head and the cable catch may be formed from a resiliently deformable material so that a width of the head is compressible by moving the first inner surface of the slot toward the second inner surface of the slot such that the head and the cable catch can be pressably inserted through the pad opening when securing the lever pad to the control device. The cable catch may be configured so that the tail of the actuation cable resists compression of the cable catch by contacting at least one of the first inner surface and second inner surface of the slot, when received therein, thereby resisting compression of the head to inhibit removal of the lever pad from the control device.

The cable catch is integrally formed with the head of the lever pad.

BRIEF DESCRIPTION OF THE DRAWINGS

Embodiments will now be described more fully with reference to the accompanying drawings, in which.

DETAILED DESCRIPTION OF EMBODIMENTS

This detailed description of embodiments, and the foregoing summary, will be better understood when interpreted in conjunction with the accompanying drawings.

As used herein, an element described in the singular and preceded by the word "a" or "an" should be understood as not necessarily excluding a plural of the elements. Further, references to "an example", "an embodiment", "one example", or "one embodiment" with a described element are not intended to be interpreted as excluding the existence of additional examples or embodiments with the described element. Moreover, unless explicitly stated to the contrary, examples or embodiments "comprising", "having", "with", or "including" an element having a particular property may further include additional elements not having that particular property. Additionally, references to "an example" or "an embodiment" throughout the subject discloser may, but do not necessarily, refer to the same example or embodiment.

As used herein, it will be understood that the terms "comprises", "has", "with", and "includes" all mean "including but not limited to" and the terms "comprising", "having", and "including" have equivalent meaning.

As used herein, the term "and/or" can include any and all combinations of one or more of the associated listed elements or features.

It will be understood that when an element is referred to as being "on", "attached", "connected", "coupled", or similarly engaged to another element, that element may be directly or indirectly on, attached, connected, or coupled to the other element. However, when an element is referred to as being "directly on", "directly attached", "directly connected", "directly coupled", "contacting", or similarly engaged to another element, there are no intermediate elements between that element and the other element. It will be similarly understood that when an element is referred to as being "proximally on", "proximally attached", "proximally connected", "proximally coupled", or similarly engaged to another element, those elements are engaged with a limited number of elements therebetween, such as a single element therebetween. It will be further understood that elements which are integrally formed may be referred to as being "on", "attached", "connected", "coupled" or similarly engaged (including the "directly" and "proximally" variants thereof). However, elements referred to as being "separably", "detachably", "selectively", "removably", or similarly coupled (and the variants thereof) are not integrally formed.

It will be understood that spatially relative terms, such as "under", "below", "lower", "over", "above", "upper", "front", "back", and the like, may be used herein for ease of describing the relationship of one element to another as depicted in the figures. However, elements described with spatially relative terms may encompass different orientations in use or operation, in addition to the orientation depicted in the figures and described herein.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, references to an element being "configured" to perform a recited function does not include an element that is unintuitively capable of performing the recited function, such as an element that is intended for a different function but could be creatively adapted to perform the recited function.

As used herein, the terms "approximately" and "about" represent an amount close to the recited amount that still performs the desired function or achieves the desired result. For example, the terms "approximately" and "about" can refer to an amount that is within engineering tolerances that would be readily appreciated by a person of ordinary skill in the art.

Bicycles commonly include mechanisms, such as seat dropper posts, which provide additional functionality to a user but are difficult to actuate directly because of their location on the bicycle. In such instances, a control device can be used to remotely actuate the mechanism. The control device can be positioned at a convenient location for the user, such as on a handlebar of the bicycle, and can be manipulated by the user to remotely actuate the mechanism.

A common type of control device uses an actuation cable that extends between the control device and the mechanism. When the control device is manipulated by the user, such as by pushing on the control device, the actuation cable transfers that motion to the mechanism to actuate the mechanism.

However, during installation, the actuation cable needs to be trimmed to a suitable length based on the locations of the control device and the mechanism on the bicycle. Typically, this is done by securing one end of the actuation cable to the mechanism, running the actuation cable along the bicycle to the control device, fixing the actuation cable to the control device by a suitable fastener, and cutting off any excess length from the end of the actuation cable.

While it may be possible to trim the actuation cable to the exact length necessary for a given application, it is generally preferably to provide some extra length that extends as a free end, or tail, beyond the fastener on the control device. This tail can help the actuation cable from becoming completely detached, for example, if the cable slips during operation of the bicycle. The tail can also be pulled on to tighten the actuation cable during maintenance of the bicycle.

Actuation cables are commonly braided metal cables. Once cut, the free end of the actuation cable will tend to fray and may painfully poke the user of the bicycle. To avoid this issue, it is common practice to cover the cut end of the actuation cable with a cable end crimp. The cable end crimp is a small cylindrical sheath, typically metal, that has a rounded tip to avoid poking a user. The cable end crimp is slipped over the cut end of the actuation cable and is secured to the actuation cable by crimping. However, these cable end crimps can fall off during operation of the bicycle, are considered ugly by some users, and add to the cost and time for installing control devices and actuation cables. Accordingly, improvements and alternatives are generally desired.

Figure 1:
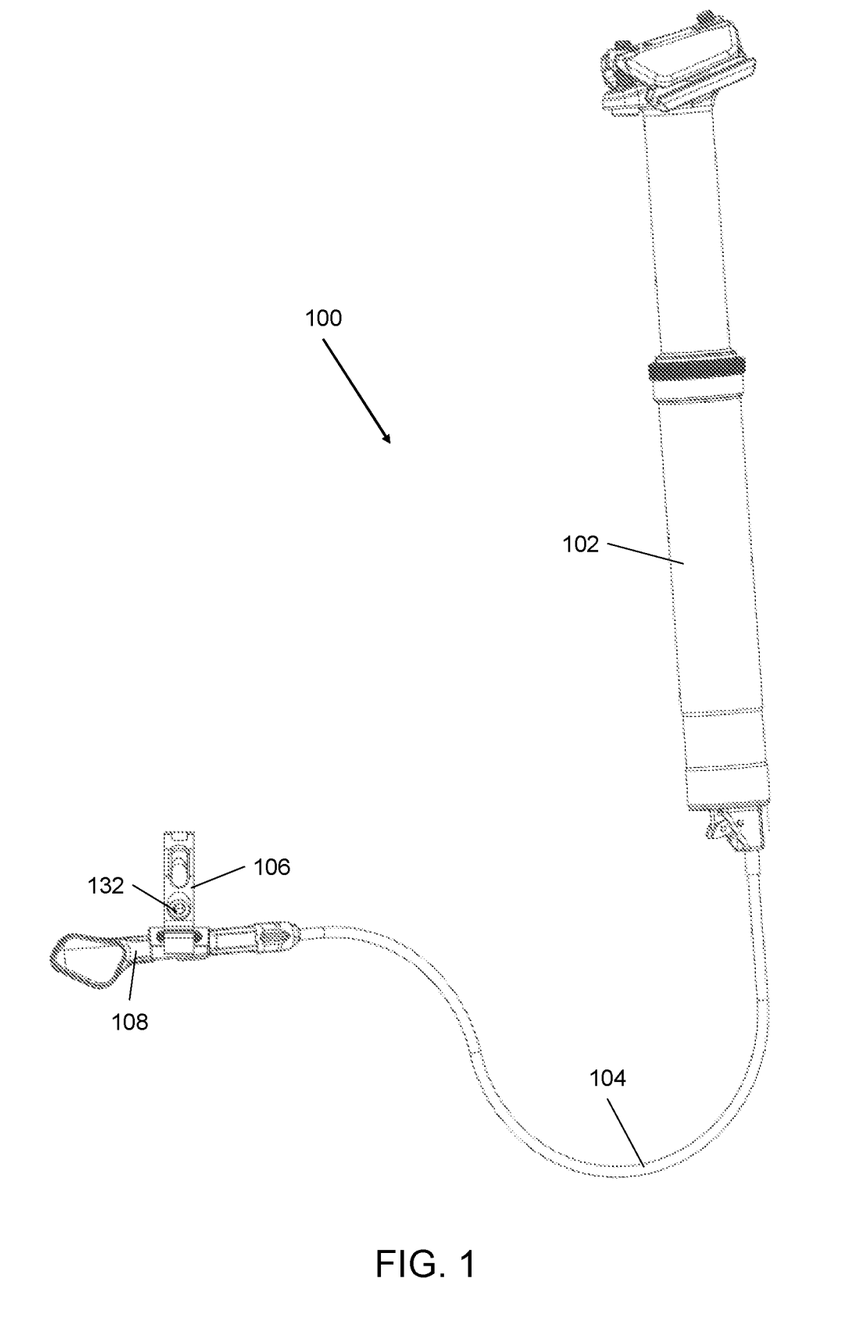
FIG. 1 is an axonometric view of a system for a bicycle in accordance with an embodiment of the present disclosure.

Turning now to FIG. 1, a system is shown and generally identified by reference character 100. The system 100 is configured to be used with a bicycle (not show). The system 100 comprises a mechanism 102, an actuation cable 112 that can optionally be housed within a conduit 104 as shown (or may not require a conduit in other examples), a control mount 106, and a control device 108. The control device 108 is connected to the control mount 106. The control mount 106 is configured to secure the control device 108 to the bicycle, such as to a handlebar of the bicycle. The conduit 104 extends between the control device 108 and the mechanism 102. The conduit 104 comprises a cable housing 110, or sheath, and an actuation cable 112 therein. The actuation cable 112 mechanically couples the control device 108 to the mechanism 102, such that the control device 108 can be manipulated to pull on the actuation cable 112 and actuate the mechanism 102. The mechanism 102 shown in FIG. 1 is a dropper seat post. However, in other embodiments, the mechanism 102 may include a suspension lockout, brakes, a bicycle shifter, derailleur or the like.

Turning now to FIGS. 2 to 6, which show the control device 108 of FIG. 1. The control device 108 comprises a frame 114, and a lever arm assembly 116. The lever arm assembly 116 is moveable relative to the frame 114 in response to an input from the bicycle rider/user. The lever arm assembly 116 can be moveably connected in a number of different, suitable ways, and may pivot, slide, rotate or otherwise be displacable relative to the frame 114 (such that an attached actuation cable is put under tension as described herein). In the illustrated example, the lever arm assembly 116 is configured and connected so that it is rotatably coupled to the frame 114 and is movable between a first position 118 (shown in FIG. 13), which can be a relaxed position, and a second position 120 (shown in FIG. 14), which can be an actuated position. Preferably, the lever arm assembly 116 can be biased toward one of its first or second positions, such that it tends to return to one of the first or second positions in the absence of a user input. The lever arm assembly 116 may be biased using any suitable biasing mechanism, such as a spring, elastic, cord or the like. In the subject embodiment, the control device 108 further comprises a bearing 122, a bearing bolt 124, a spring 126, and a barrel adjuster 128. The bearing 122 is coupled between the lever arm assembly 116 and the frame 114, which may help reduce rotational friction therebetween. The bearing bolt 124 secures the bearing 122 to the frame 114. In this example, the spring 126 is included as a biasing member and biases the lever arm assembly 116 towards the first position 118. The barrel adjuster 128 may be used to fine tune adjustment of the actuation cable 112.

Figure 2:
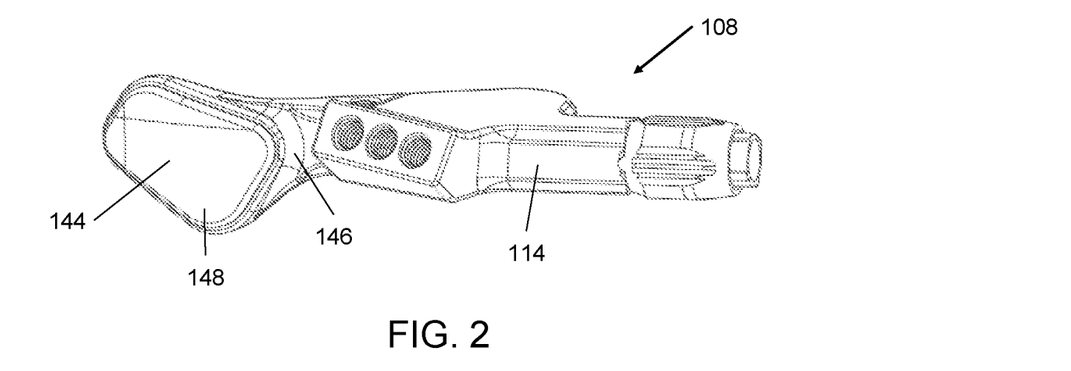
FIG. 2 is an axonometric view of a control device in accordance with an embodiment of the present disclosure, such as the control device shown in FIG. 1.
Figure 5:
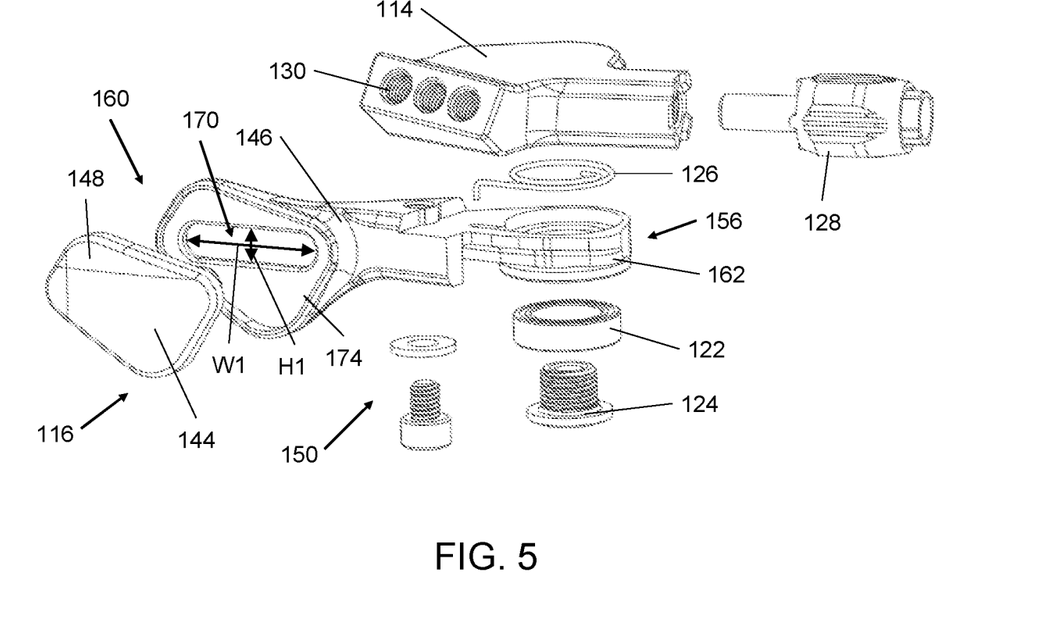
FIG. 5 is an exploded view of the control device of FIG. 2, showing a top, user facing angle.
Figure 6:
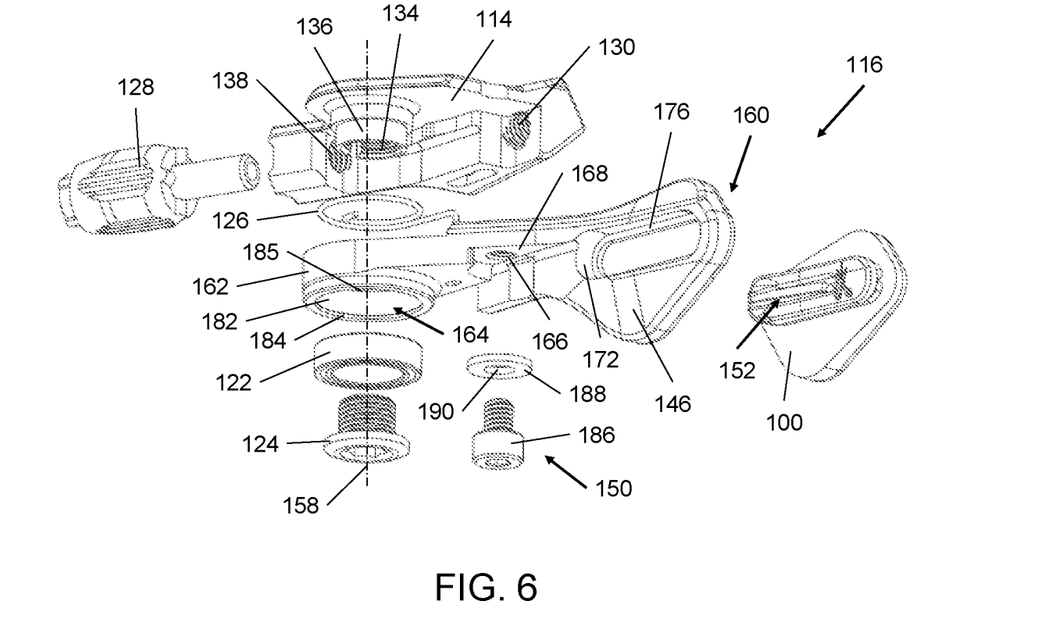
FIG. 6 is an exploded view of the control device of FIG. 2, showing a below, rear facing angle.
Figure 7:
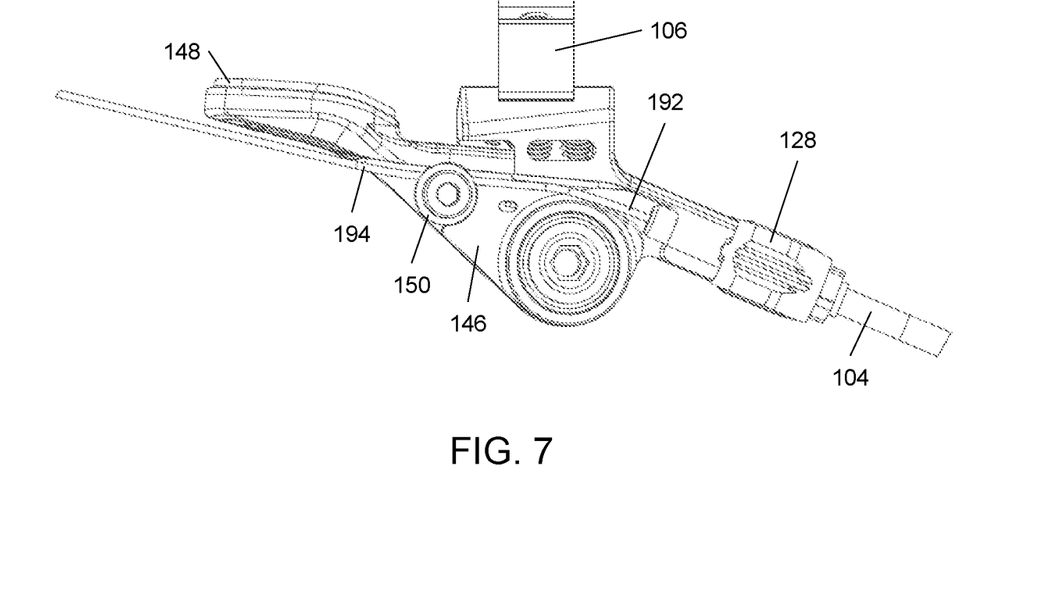
FIG. 7 is a bottom view of the control device of FIG. 2, with an actuation cable partially installed.
Figure 8:
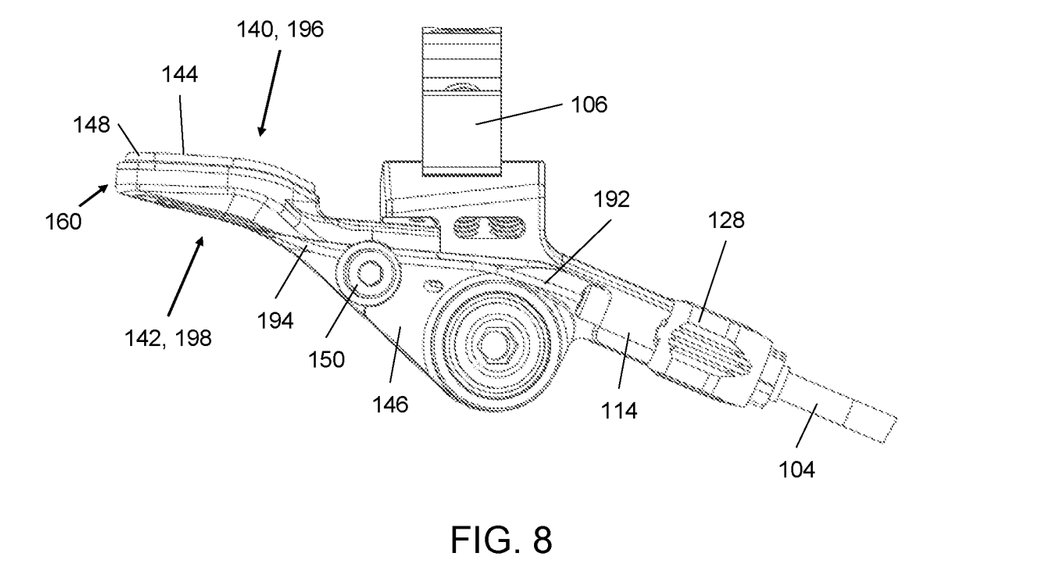
FIG. 8 is a bottom view of the control device of FIG. 2, with the actuation cable fully installed.

The frame 114 is configured to secure the control device 108 to the bicycle, via the control mount 106. The control mount 106 may be of any suitable configuration that is compatible with a desired mounting location on the bicycle frame or other bicycle component and may include a variety of mounting hardware and options. For example, the control mount 106 may be configured to connect to the handle bars, frame or other suitable location on a bicycle—and different embodiments of the assemblies described herein may include different mounts 106 to be mounted in different ways. In the illustrated example, the frame 114 comprises at least one threaded mounting hole 130 for receiving a mounting bolt 132. The mounting bolt 132 couples the frame 114 to the control mount 106. The frame 114 further comprises a threaded bearing bolt hole 134, a bearing mount 136, and a threaded barrel adjuster hole 138. In this arrangement, the bearing mount 136 engages the bearing 122, when the bearing 122 is coupled between the lever arm assembly 116 and the frame 114. The threaded bearing bolt hole 134 receives the bearing bolt 124 to secure the bearing 122 to the frame 114. The threaded barrel adjuster hole 138 receives the barrel adjuster 128 and cooperates with the barrel adjuster 128 to help enable fine turning of the actuation cable 112, by helping to provide a relatively fine adjustment/positioning of the lever arm assembly 116 relative to the frame 114.

Figure 3:
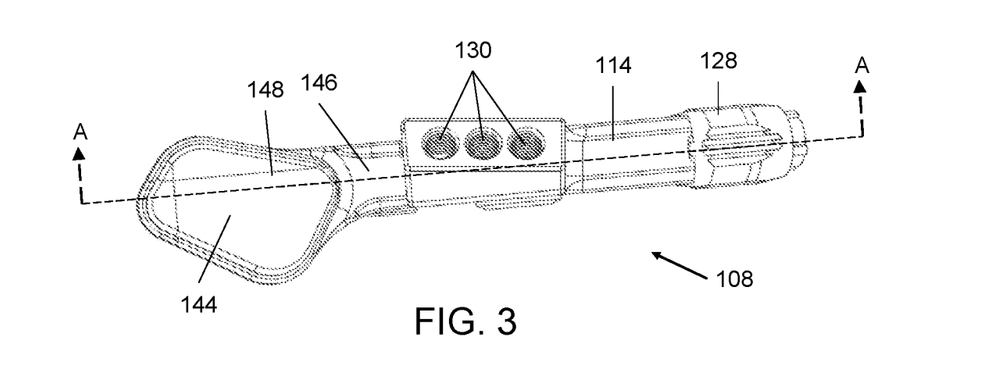
FIG. 3 is a user facing view of the control device of FIG. 2.
Figure 4:
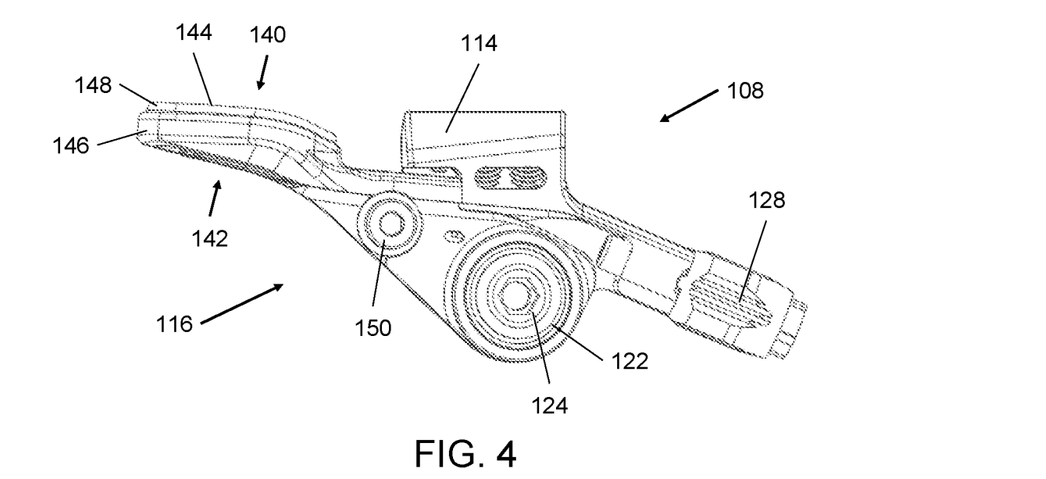
FIG. 4 is a bottom view of the control device of FIG. 2.

The lever arm assembly 116 is preferably configured to be manipulated by a user to move from the first position 118 to the second position 120 (or vice versa). The lever arm assembly 116 in this description is understood to include a first, user facing side 140 and a second, rear side 142, opposite the user facing side 140 in a first or front/back direction. The user facing side 140 faces the user of the bicycle, when the control device 108 is secured to the bicycle. Preferably, at least one of the user facing side 140 and the rear side 142 are configured to be touched and engaged by a user to trigger the mechanism 102. One, or both, of the sides 140 and 142 can therefore include one or more features, surfaces and/or structures that are designed to accommodate engagement by a user and can be, for example, sized to fit and receive a finger or thumb of a user and to provide engagement locations that are generally comfortable and safe for a user to touch. This can include surfaces for pressing or pushing on the assembly, or alternatively structures for grabbing or pulling on the movable portions. These engagement structures may be formed from relatively hard materials (as described herein) or optionally may be provided with pads or other type of cushioning structures that could help improve user comfort. Multiple configurations are possible, and in the illustrated example the user facing side 140 comprises a pressing face 144. The pressing face 144 is positioned so as to be pressable by the user, when the control device 108 is secured to the bicycle, to move the lever arm assembly 116 from the first position 118 toward the second position 120. For example, if the control device 108 is secured to the handle bars of a bicycle the pressing face 144 may be positioned above or below the handle bar (often below) and may be facing the user so that it can be pressed by the thumb of the user.

In this example, the lever arm assembly 116 is configured to pull on the actuation cable 112 as the lever arm assembly 116 rotates from the first position 118 toward the second position 120. This pulling motion on the actuation cable 112 is transmitted from the lever arm assembly 116 to the mechanism 102, at the opposite end of the actuation cable 112, which actuates the mechanism 102. Accordingly, the mechanism 102 can be remotely actuated by manipulating the lever arm assembly 116. In the subject embodiment, the frame 114 holds the cable housing 110 static as the lever arm assembly 116 pulls on the actuation cable 112. Holding the cable housing 110 static while pulling on the actuation cable 112 provides relative motion between the actuation cable 112 and the cable housing 110, which can help transmit the motion of the actuation cable 112 to the mechanism 102.

The lever arm assembly 116 can include any suitable hardware/mechanism that can be engaged and actuated by a user as described herein, and in this illustrated example includes a lever arm 146, a lever pad 148, and a cable lock 150. The lever arm 146 is rotatably coupled to the frame 114, via the bearing 122 and the bearing bolt 124. While this lever arm 146 is rotatably connected, other examples of the device 108 the lever arm could be translatable or otherwise movingly connect to the frame to pull on the cable 112.

In this example, the lever pad 148 and the cable lock 150 are secured to the lever arm 146, such that the lever pad 148 and the cable lock 150 rotate with the lever arm 146 as the lever arm assembly 116 moves between the first position 118 and the second position 120. The cable lock 150 fixes the actuation cable 112 to the lever arm 146.

In this example, a portion of the lever pad 148 provides the pressing face 144 and is located on the user facing side of the lever arm assembly 116, and a portion of the lever pad 148 is located on the rear side of the lever arm assembly 116 (with a connecting neck portion extending therebetween). The lever arm assembly 116 also includes a cable catch 152 for removably retaining at least a portion of the actuation cable 112, as described below.

In the subject embodiment, with at least a portion of the lever pad 148 being located on the rear side of the lever arm assembly 116, the lever pad 148 is in a configuration in which the cable catch 152 can be provided in the lever pad 148. Optionally, the portion of the lever pad 148 that includes the cable catch 152 need not be integrally formed with the pressing surface and may be independently connectable or removable from the lever arm 146. Alternatively, in other embodiments, the cable catch 152 may be integrally formed with the lever arm 146 instead of being provided in a separate member that is separable from the lever arm 146. For example, in some embodiments the cable catch 152 may be formed in a member that is removable from the lever arm (such as in a portion of the lever pad 148 as described herein) while in other embodiments, such as in embodiments where the lever pad 148 or similar member is omitted, the cable catch 152 may be non-removably formed in the lever arm 146.

The lever arm 146, in this example, supports the lever pad 148 and the cable lock 150. The lever arm 146 is configured to pull on the actuation cable 112 as the lever arm assembly 116 rotates from the first position 118 toward the second position 120. The lever arm 146 is rotatably coupled to the frame 114 at a pivot point 154. The pivot point 154 is located near a root end 156 of the lever arm 146. When the user presses on the pressing face 144, the lever arm 146 rotates about the pivot point 154 as the lever arm assembly 116 moves from the first position 118 to the second position 120. When the user stops pressing on the pressing face 144, the bias of the spring 126 rotates the lever arm 146 in an opposite direction about the pivot point 154 as the lever arm assembly 116 returns to the first position 118. In the subject embodiment, the pivot point 154 is defined by a rotational axis 158 of the bearing 122. The lever arm 146 defines a lever arm radius R0 that extends from the pivot point 154 to a middle of the pressing face 144. The lever arm radius R0 helps provide mechanical advantage when pulling on the actuation cable 112, as described below. In the subject embodiment, the lever arm 146 is formed of a hard resilient material, such as metal (like aluminium) or hard plastic.

The lever arm 146 comprises a guide surface such as the cable cam surface 162, a bearing opening 164, a threaded cable bolt hole 166, and a cable clamping surface 168. The cable cam surface 162 is curved and extends at least partially around the pivot point 154. The bearing opening 164 is concentric with the pivot point 154 and is located at a root end 156 of the lever arm 146. The threaded cable bolt hole 166 extends into the lever arm 146 and is positioned at a distance from the pivot point 154. The cable clamping surface 168 surround the threaded cable bolt hole 166. In the subject embodiment, the lever arm 146 further comprises a pad opening 170, a pad body recess 172, a pad head recess 174, and a pad retaining flange 176, as described below.

Figure 13:
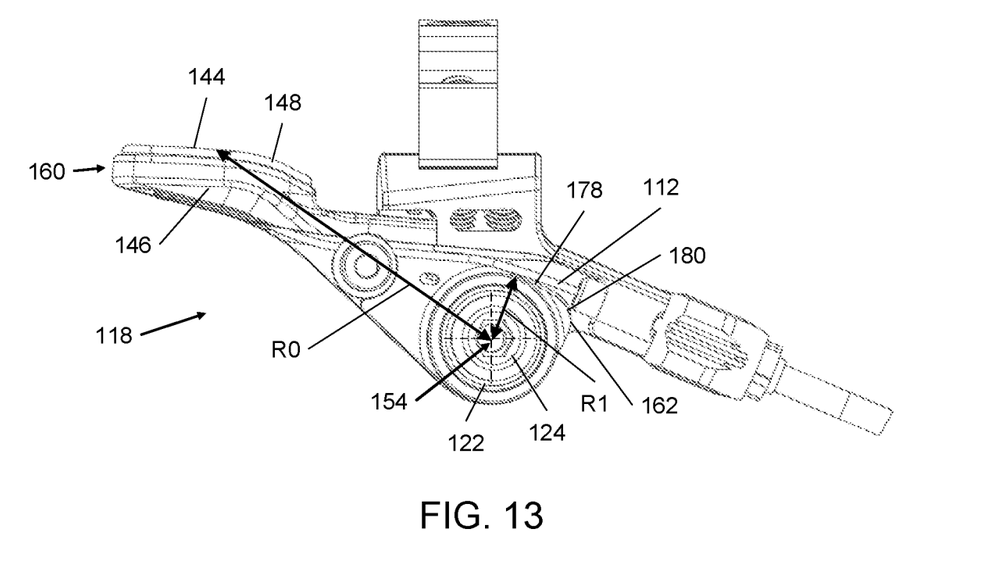
FIG. 13 is a bottom view of the control device of FIG. 2, in a first position.

The cable cam surface 162 is, in this example, configured to engage and pull on the actuation cable 112, as the lever arm assembly 116 moves from the first position 118 toward the second position 120. The cable cam surface 162 extends at least partially around the pivot point 154. In the subject embodiment, the cable cam surface 162 extends from the cable clamping surface 168, around the pivot point 154, and back to the cable clamping surface 168. The cable cam surface 162 extends between a low-profile surface 178 and a high-profile surface 180, as shown in FIG. 13. The cable cam surface 162 defines a changing radius as it extends around the pivot point 154. The changing radius includes a first radius R1, where the actuation cable 112 starts engaging the cable cam surface 162 when the lever arm assembly 116 is in the first position 118, and a second radius R2, where the actuation cable 112 starts engaging the cable cam surface 162 when the lever arm assembly 116 is in the second position 120. The first radius R1 is smaller than the second radius R2. The changing radius of the cable cam surface 162 is configured to provide variable mechanical advantage, as described below.

The bearing opening 164 is sized to receive and retain the bearing 122. The bearing opening 164 is defined by a bearing engaging surface 182, a bearing retaining lip 184, and a bearing clearance diameter 185. The bearing engaging surface 182 is located between the bearing retaining lip 184 and the bearing clearance diameter 185. The bearing clearance diameter 185 aligns the bearing 122 as it is inserted into the bearing opening 164. When the bearing 122 is received in the bearing opening 164, the bearing 122 frictionally engages the bearing engaging surface 182 to fixedly couple the bearing 122 to the lever arm 146. The bearing retaining lip 184 engages a bottom of the bearing 122, to retain the bearing 122 within the bearing opening 182.

The threaded cable bolt hole 166 and the cable clamping surface 168 are configured to cooperate with the cable lock 150 to fix the actuation cable 112 to the lever arm 146, as described below.

The cable lock 150 can be any suitable structure that can help fix or secure the actuation cable 112 to the lever arm 146 such that the actuation cable 112 moves with the lever arm 146 as the lever arm assembly 116 rotates between the first position 118 and the second position 120. The cable lock 150 in this example includes a cable bolt 186 and a cable washer 188, but could have other configurations in other examples, and may include clips, clamps and other suitable fasteners. In this example, the cable bolt 186 secures the cable washer 188 to the lever arm 146. To secure the cable washer 188 to the lever arm 146, the cable bolt 186 is inserted through a central opening 190 of the cable washer 188 and is threaded into the threaded cable bolt hole 166. When secured to the lever arm 146, the cable washer 188 opposes the cable clamping surface 168 of the lever arm 146. During installation, the actuation cable 112 is placed between the cable washer 188 and the cable clamping surface 168. The cable bolt 186 is then tightened to apply a clamping pressure to the actuation cable 112, thereby fixing the actuation cable 112 to the lever arm 146.

Once the actuation cable 112 is fixed to the lever arm 146, the cable lock 150 demarcates a working segment 192 of the actuation cable 112 from a tail 194 of the actuation cable 112. The working segment 192 of the actuation cable 112 transmits the motion of the actuation cable 112 to the mechanism 102. The tail 194 of the actuation cable 112 is a free end that extends from the cable lock 150 and does not transmit motion to the mechanism 102 (and in many embodiments will not be under any material tensile loading).

As mentioned above, in the subject embodiment the lever arm 146 further comprises a pad opening 170, a pad retaining flange 176, a pad body recess 172, and a pad head recess 174. The pad opening 170 extends through the lever arm 146, and may be of any suitable shape, size and configuration. In this example, the pad retaining flange 176 circumscribes the pad opening 170 and is positioned between the pad body recess 172 and the pad head recess 174. The pad body recess 172 is formed in a user facing side 196 of the lever arm 146. The pad head recess 174 is formed in a rear side 198 of the lever arm 146, opposite the user facing side. In some embodiments, one or more of the pad opening 170, the pad body recess 172, the pad head recess 174, and the pad retaining flange 176 may be omitted, such as in embodiments where the lever pad 148 is omitted or is only provided on the user facing side 140 of the lever arm assembly 116. Other arrangements are possible for different lever arm 146 designs.

Optionally, the pad opening 170 may be configured to receive at least a portion of the lever pad 148 therethrough, which may help secure the lever pad 148 to the lever arm 146 in the illustrated example. In other examples, the lever pad 148 may be attached in other ways, such as by using fasteners, adhesives and the like. In the illustrated example, the pad opening 170 is a through-hole located near a distal end 160 of the lever arm 146, opposite the root end of the lever arm 146. The pad retaining flange 176 defines the dimensions of the pad opening 170. The pad opening 170 has a width W1 that is sized to accommodate the lever pad 148. In the subject embodiment, the width W1 extends in a generally horizontal direction. However, it will be appreciated that the term "width" simply refers to the widest dimension of the pad opening 170 and, in some embodiments, the width W1 of the pad opening 170 may extend in another direction that is not generally horizontal. In the subject embodiment, the pad opening 170 also has a height H1, which extends in a generally vertical direction and is less than the width W1. Accordingly, the pad opening 170 in this example has a slot-like shape, with other shapes being possible in other embodiments.

The lever pad 148 is configured to be pressably inserted into the pad opening 170, to secure the lever pad 148 to the lever arm 146. Accordingly, in the subject embodiment, the lever pad 148 is secured near the distal end of the lever arm 146. As shown in FIGS. 15 to 18, the lever pad 148 comprises a body 200, a neck 202, and a head 204. The body 200 and the head 204 securely extend from opposite ends of the neck 202, with the body 200 extending from a pressing end 206 of the neck 202 and the head 204 extending from a rear end 208 of the neck 202. In the subject embodiment, the body 200, the head 204, and the neck 202 are integrally formed. When the lever pad 148 is secured to the lever arm 146, the body 200 is received in the pad body recess 172 of the lever arm 146, the head 204 is received in the pad head recess 174 of the lever arm 146, and the neck 202 extends through the pad opening 170. The body 200 and the head 204 are sized to be wider than the pad opening 170 and engage opposite sides of the pad retaining flange 176, to secure the lever pad 148 to the lever arm 146. The neck 202 is sized to pass through the pad opening 170 and is encircled by the pad retaining flange 176, when the lever pad 148 is secured to the lever arm 146.

Figure 15:
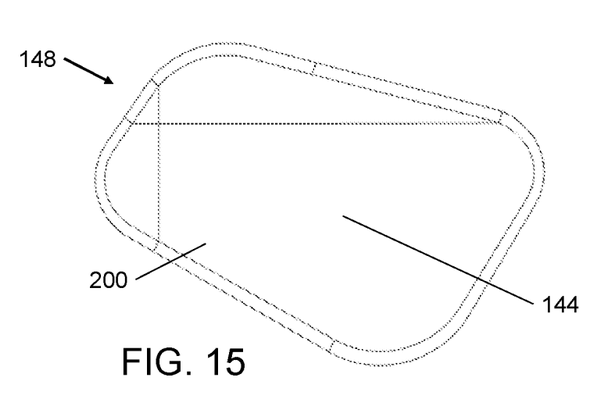
FIG. 15 is a user facing view of a lever pad for the control device of FIG. 2.

The body 200 of the lever pad 148 is configured to be pressed by the user of the bicycle to insert the lever pad 148 into the pad opening 170. The body 200 is further configured to be pressed the user to move the lever arm assembly 116 from the first position 118 toward the second position 120. The body 200 includes the pressing face 144, which is sized to be pressed by the user, such as by a thumb of the user. The body 200 is formed of a resilient compressible material, such as silicone, plastic, or rubber, to provide a comfortable surface for the user to press.

Figure 16:
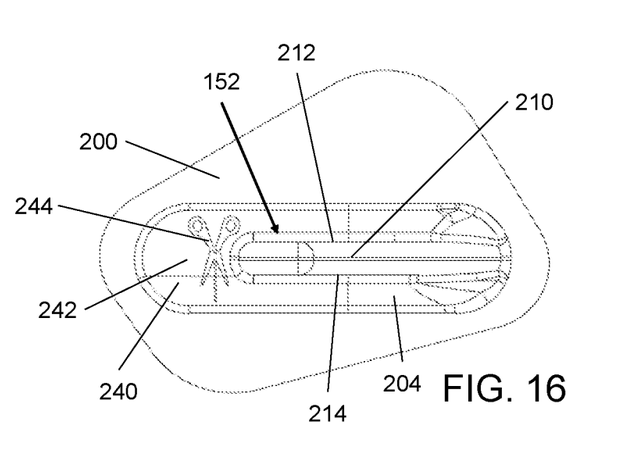
FIG. 16 is a rear view of the lever pad of FIG. 15, with a vertical axis inverted.
Figure 17:
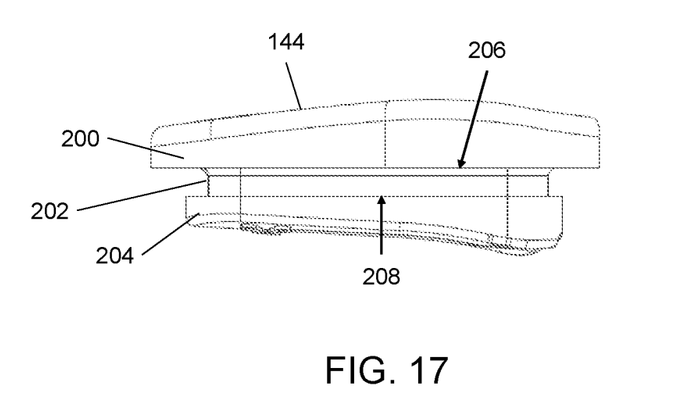
FIG. 17 is a bottom view of the lever pad of FIG. 15.
Figure 18:
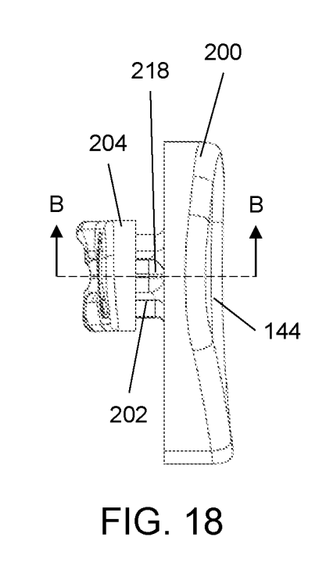
FIG. 18 is a left side view of the lever pad of FIG. 15.

The head 204 of the lever pad 148 is configured to be pressably inserted through the pad opening 170, when securing the lever pad 148 to the lever arm 146. Accordingly, the head 204 is formed of a resilient compressible material, such as silicone, plastic, thermoplastic polyurethane, thermoplastic rubber or rubber, which can be compressed to pass through the pad opening 170 during the installation and/or removal process—and optionally to generally occupy the space within the pad opening when the lever pad 148 is installed. The head 204 can also be compressed to optionally remove the lever pad 148 from the lever arm 146. The head 204 includes a recess 210 that forms part of the cable catch 152, as described below. The recess 210 defines a distanced in a vertical direction between a first (or top) inner surface 212 and a second (or bottom) inner surface 214. In this arrangement, when the head 204 is compressed to pass through the pad opening, such as when securing the lever pad 148 to the lever arm 146 or in order to remove the lever pad 148 from the lever arm 146, the head 204 is compressed in the vertical direction by moving the first inner surface 212 toward the second inner surface 214.

When using the lever pad 148 as illustrated, the cable catch 152 can be provided in the head 204 of the lever pad 148 (which is located on the rear side of the lever arm 146). The cable catch 152 may optionally also extend at least partially into the neck 202 of the lever pad 148 as shown in the present example (but in other examples may be contained entirely within the head 204). In the subject embodiment, the cable catch 152 is integrally formed in the head 204 and the neck 202 of the lever pad 148. Accordingly, the cable catch 152 is at least partially located on the rear side 142 of the lever arm assembly 116, and the cable catch 152 can be optionally removed from the lever arm 146 with the lever pad 148. The cable catch 152 is located directly opposite the pressing face 144 in this example. In this arrangement, the cable catch 152 is located within a projection of an area of the pressing face 144 in a rearward direction.

Figure 11:
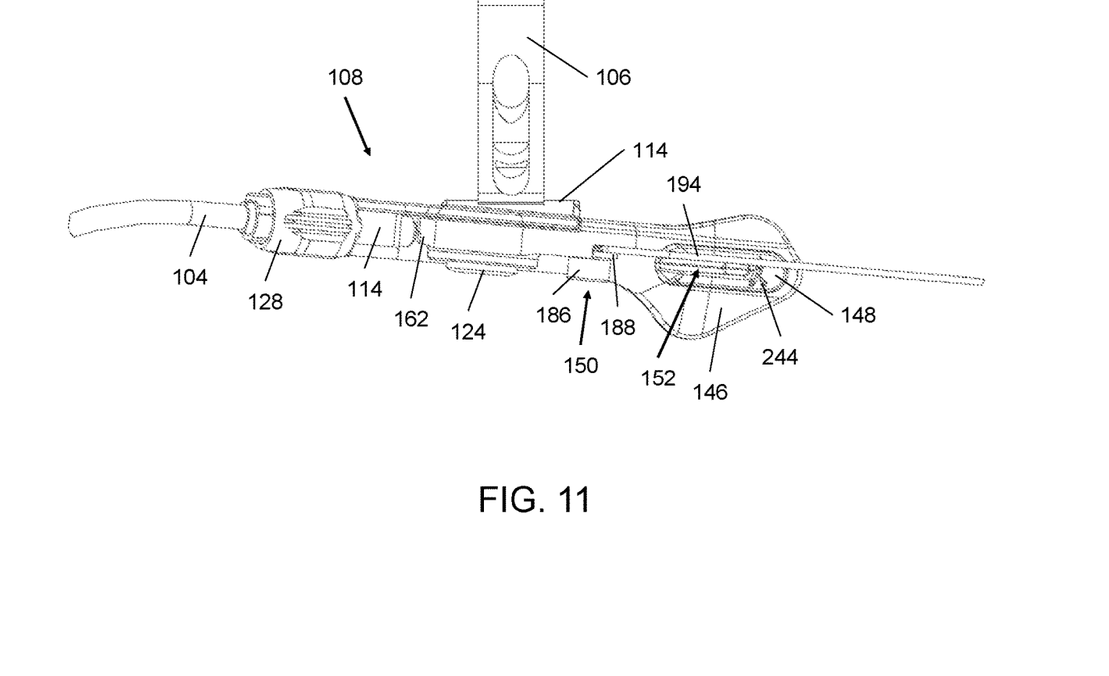
FIG. 11 is a rear view of the control device of FIG. 2, with the actuation cable partially installed.
Figure 12:
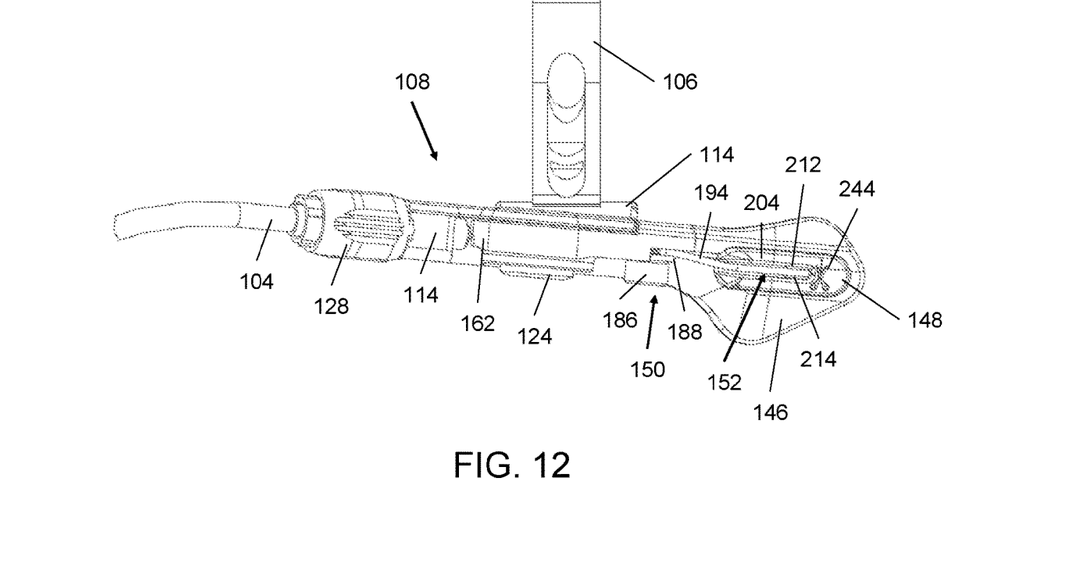
FIG. 12 is a rear view of the control device of FIG. 2, with the actuation cable fully installed.
Figure 20:
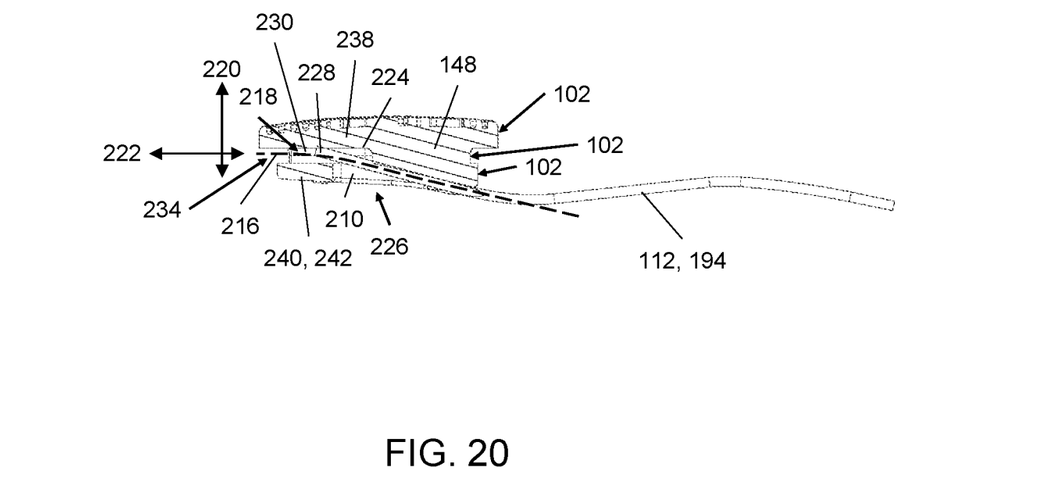
FIG. 20 is a sectional view of the lever pad of FIG. 15, taken along line B-B of FIG. 18, with the actuation cable fully installed.

The cable catch 152 is configured to removably retain at least a portion of the tail 194 of the actuation cable 112. The cable catch 152 defines a cable path 216 (as shown in FIG. 20), which the tail 194 of the actuation cable 112 follows when received in the cable catch 152. The cable catch 152 comprises the recess 210, which extends along an axial direction of the cable path 216. The cable catch 152 further comprises a tip concealing region 218, which is located after the recess 210 along the cable path 216. As will be appreciated, "after" in the context of the cable path 216 means further from the cable lock 150 along the cable path 216. As shown in at least FIGS. 11 and 12, the cable catch 152 is spaced apart from the cable lock 150.

The recess 210 is configured to pressably receive the tail 194 of the actuation cable 112 (or a portion thereof). That is, the tail 194 of the actuation cable 112 can be pressed into the recess 210 in a depthwise direction 220 that is generally perpendicular to the axial direction 222 of the cable path 216. In the subject embodiment, the recess 210 is a slot defined by a base 224 and the opposing first and second inner surfaces 212, 214 of the head 204, which extend rearwardly from the base 224. The slot has an open side 226, at the rear side 142 of the lever arm assembly 116, to receive the tail 194 of the actuation cable 112. The tail 194 of the actuation cable 112 is received in the recess 210 in a depthwise direction, such that the tail 194 of the actuation cable 112 is positioned between and engages the first inner surface 212 and the second inner surface 214. When the tail 194 of the actuation cable 112 is received in the recess 210 of the cable catch 152 and disposed between the first and second inner surfaces 212, 214, the tail 194 resists compression of the head 204 (for example, by contacting surfaces 212 and 214 and preventing them from moving closer to each other). Inhibiting, and/or preventing, the compression of the head 204 in this manner can prevent the head 204 from being compressed to the extent necessary for the head 204 to pass through the pad opening 170. If the head 204 is not compressed to fit through the pad opening it may inhibit removal of the head 204 through the pad opening 170 and thereby inhibit removal of the lever pad 148 from the lever arm 146, when the tail 194 of the actuation cable 112 is received in the cable catch 152. In such configurations, the presence of the tail 194 within the cable catch 152 have locking effect and can prevent separation of the lever pad 148, in addition to housing the tail 194. However, since the slot includes the open side 226 and is spaced apart from the cable lock 150, the cable catch 152 allows access to the tail 194 of the actuation cable 112 when received therein, to permit selective removal of the tail 194 from the cable catch 152. Removing the tail 194 from the slot 226 can effectively unlock the lever pad 148 and can allow compression of the head 204. This permits the lever pad 148 to be selectively removed from the lever arm 146 without further disassembling the lever arm assembly 116.

The tip concealing region 218 of the cable catch 152 is configured to receive a distal tip 228 of the tail 194 of the actuation cable 112. The tip concealing region 218 is located after the recess 210 along the cable path 216. The tip concealing region 218 comprises an axially extending cavity 230 having a first end 232, which is open and adjacent the recess 210, and a terminal end 234, which is axially spaced apart from the first end 232 along the cable path 216. Optionally, the terminal end 234 can be closed so that the cavity 230 is a closed bottom cavity and so that the distal tip 228 of the tail 198 is not visible or accessible from outside the cavity 230. However, the tip concealing region 218 is also generally configured to fit through the pad opening, which may mean that the portions bounding the cavity 230 are formed from a resiliently compressible material that may be softer than the material of the actuation cable 112. In such circumstances, the distal tip 228 of the tail 194 may rub against and damage portions of the lever pad 148 when the bicycle is in use—such as if the frayed end of a braided metal cable were to contact a soft, rubber like material. Alternatively, instead of providing a closed terminal end 234 that is formed form the same material as the rest of the lever pad 148, the terminal end 234 may be axially open such that the soft material of the lever pad is not directly opposing or in contact with the axial end of the distal tip 228.

Figure 9:
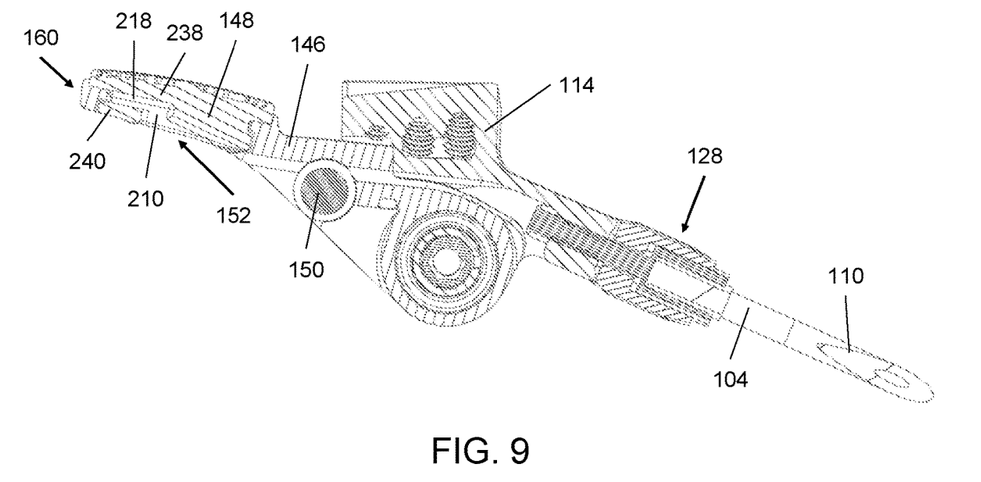
FIG. 9 is a sectional view of the control device of FIG. 2, taken along line A-A of FIG. 3.
Figure 10:
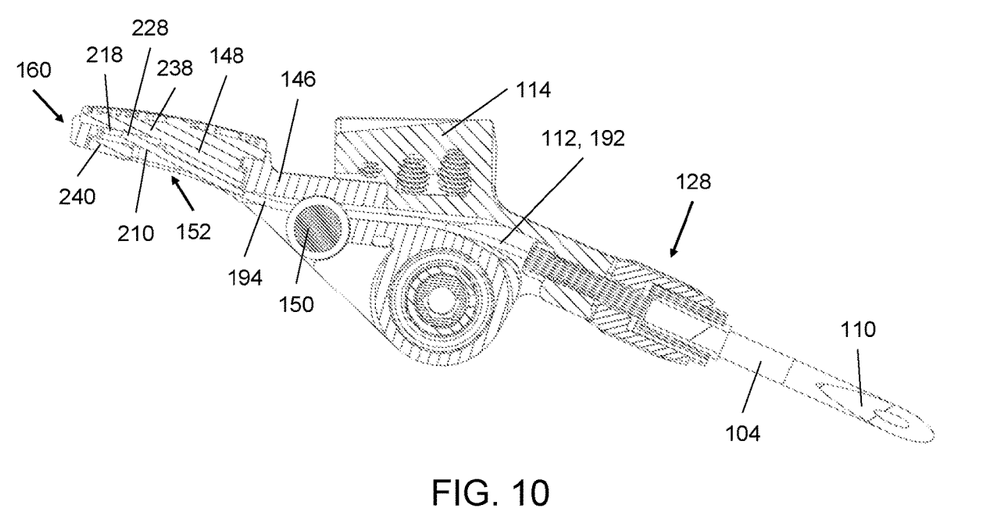
FIG. 10 is a sectional view of the control device of FIG. 2, taken along line A-A of FIG. 3 with the actuation cable fully installed.
Figure 19:
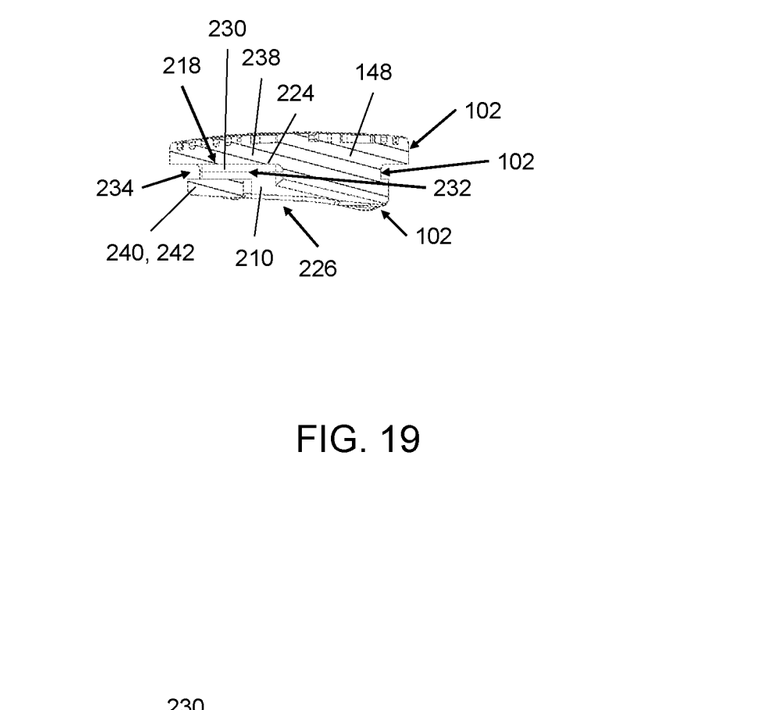
FIG. 19 is a section view of the lever pad of FIG. 15, taken along line B-B of FIG. 18.

For example, as shown in FIG. 19, the terminal end 234 of the cavity 230 is also an open end. However, it may still be desirable in some embodiments for the distal tip 228 to be covered/obscured so that it does not poke the user or contact and cause damage to other components. Therefore, in the present example the lever pad 146 is configured so that when the lever pad 148 is secured to the lever arm 146, as shown in FIG. 9, the terminal end 234 that would otherwise be open if the lever pad 148 were in isolation is covered/blocked by an opposing surface/portion of the distal end 160 of the lever arm 146. This distal end 160 can be formed from a material that is more durable than the lever pad 148 (and need not be compressible in the same way) which may be more robust and may better withstand the rubbing or abrasion from the distal tip 228.

For example, in the illustrated example the first end 232 and the terminal end 234 of the tip concealing region 218 are bounded in a depthwise direction by a base portion 238 and a cover portion 240 of the lever pad 148. In the subject embodiment, the body 200 of the lever pad 148 comprises the base portion 238 and the head 204 of the lever pad 148 comprises the cover portion 240. The cover portion 240 is rearwardly spaced apart from the base portion 238 in a depthwise direction of the lever pad 148. The cover portion 240 overlies the base portion 238, so that the cavity 230 is configured to slidably receive, in the axial direction, the distal tip 228 of the tail 194 of the actuation cable 112, such that the distal tip 228 is disposed between the base portion 238 and the cover portion 240. The cover portion 240 of the tip concealing region 218 of the cable catch 152 comprises a tip shield 242.

The tip shield 242 is configured inhibit contact between the user of the bicycle and the distal tip 228 of the tail 194 of the actuation cable 112. The tip shield 242 at least partially covers the distal tip 228 to inhibit such contact, when the distal tip 228 is received in the tip concealing region 218. The tip shield 242 extends over the cavity 230 in the rearward direction. Accordingly, the tip shield 242 overlies the distal tip 228 in the rearward direction, when the distal tip 228 is received in the cavity 230 of the tip concealing region 218. In this manner, the tip shield 242 can reduce the likelihood that the user of the bicycle will painfully poke themselves with the distal tip 228 of the actuation cable 112, even if the distal tip 228 becomes frayed. Accordingly, the tip shield 242 may obviate the need for the user to apply a cable end crimp to cover the end of the actuation cable 112. Additionally, the tip shield 242 can inhibit removal of the actuation cable 112 from cable catch 152, by requiring the distal tip 228 to be axially withdrawn from the tip concealing region 218, which is a motion that is less likely to occur during riding of the bicycle than motion in the depthwise direction 220.

Turning now to FIGS. 7 to 12, which show the control device 108 during various steps of installing the actuation cable 112. To install the actuation cable 112 in the control device 108, the actuation cable 112 is passed through the threaded barrel adjuster hole 138 and then pulled on by the user to remove unwanted slack. Once the slack has been removed, the actuation cable 112 is fixed to the lever arm 146 by the cable lock 150. In the subject embodiment, the actuation cable 112 is positioned between the cable clamping surface 168 of the lever arm 146 and the cable washer 188 of the cable lock 150. The cable bolt 186 is then tightened to clamp the actuation cable 112 between the cable washer 188 and the cable clamping surface 168, thereby fixing the actuation cable 112 to the lever arm 146.

Once the actuation cable 112 has been fixed to the lever arm 146, the tail 194 of the actuation cable 112 can be cut to an appropriate length. In the subject embodiment, the head 204 of the lever pad 148 comprises an indicia 244 to indicate where the tail 194 of the actuation cable 112 should be cut. The indicia 244 is positioned at a location that is a pre-set, tail distance from the cable lock 150. This tail distance is selected to generally match, or preferably be slightly less than the path length of the cable path between the cable lock 150 and the terminal end 234. In this arrangement, a user can fasten the cable 112 using the cable lock 150 and allow the remainder of the cable to extend along the rear side of the assembly, and to overlie or pass by the indicia 244. A use can then cut the cable at the location that corresponds to the location of the indicia 244, and the tail that is created by cutting at that location will have a length that is compatible with the cable catch 152. This may help a user create a cable tail 194 that is an appropriate length to be received in the cable catch 152 and is not too short (where it may not be properly engaged) or too long (where it may bow, buckle or otherwise not fit within the cable catch 152 as described). The indicia 244 may be a graphic, image, texture, surface feature or other feature that can be recognized by the user.

Once the tail 194 of the actuation cable 112 is an appropriate length, the tail 194 can be concealed within the cable catch 152 at the rear side 142 of the lever arm assembly 116. The tail 194 is received in the cable catch 152 by axially inserting the distal tip 228 of the tail 194 in the cavity 230 of the tip concealing region 218 and by pressably inserting a remainder of the tail 194 in the recess 210. As will be appreciated, this bimodal inserting of the tail 194 into the cable catch 152 can inhibit accidental removal, or "backing out" of the tail 194 from the cable catch, as described above. To facilitate inserting the tail 194 into the cable catch 152, a user can induce a bend in the tail 194 of the actuation cable 112 before inserting the tail 194 in the cable catch 152. As will be appreciated, this bend can be a depthwise bend that angles the distal tip 228 of the actuation cable 112 toward the tip concealing region 218 of the cable catch 152.

Once received in the cable catch 152, the tip shield 242 and the cover portion 240 overly the distal tip 228 of the actuation cable 112 in the depthwise direction, at the tip shield 242 of the lever arm assembly 116. As described above, this can reduce the likelihood that the user of the bicycle will painfully poke themselves with the distal tip 228 of the actuation cable 112, even if the distal tip 228 becomes frayed. Additionally, because the terminal end 234 of the cavity 230 in the tip concealing region 218 of the cable catch 152 is covered by the distal end 160 of the lever arm 146, which is preferably formed of a hard resilient material, the likelihood that the distal tip 228 of the actuation cable 112 will push through the lever pad 148 and poke the user is reduced.

To remove the tail 194 of the actuation cable 112 from the cable catch 152, such as during maintenance to tighten the working segment of the actuation cable 112, the user of the bicycle can either fish the actuation cable 112 out of the cable catch 152 through the open side 226 of the recess 210, or the user can pull on an exposed portion of the actuation cable 112 that extends between the cable lock 150 and the cable catch 152, since the cable lock 150 and the cable catch 152 are spaced apart from one another. In this way, the control device 108 described herein can help protect a user from being poked by the end of the actuation cable 112, without the need for a cable end crimp, while also allowing the user to readily access the tail 194 of the actuation cable 112 to perform maintenance or the like.

Figure 14:
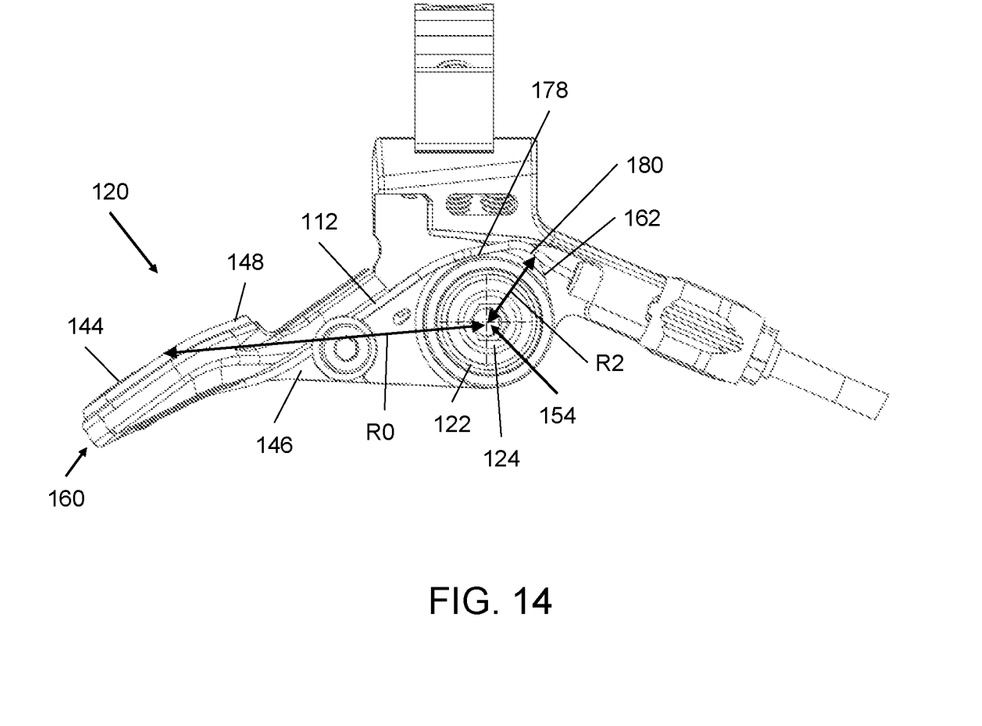
FIG. 14 is a bottom view of the control device of FIG. 2, in a second position.

Turning now to FIGS. 13 and 14, which show the control device 108 with the lever arm assembly 116 in the first position (FIG. 13) and the second position (FIG. 14).

During use of the control device 108, the user of the bicycle can manipulate the lever arm assembly 116 to move the lever arm assembly 116 from the first position 118 to the second position 120. The user can move the lever arm assembly 116 by pressing on the pressing face 144, such as with their thumb.

As the lever arm assembly 116 moves from the first position 118 to the second position 120, the cable cam surface 162 of the lever arm 146 engages and pulls on the actuation cable 112. As described above, this motion of the actuation cable 112 is transmitted to the mechanism 102 on the bicycle, such as to a dropper seat post, to actuate the mechanism 102.

The lever arm assembly 116 provides a mechanical advantage when pulling on the actuation cable 112. As will be appreciated, the mechanical advantage is determined by the ratio of the lever arm radius R0 to the radius of the cable cam surface 162, where the actuation cable 112 meets the cable cam surface 162 (i.e. the first radius R1, when the lever arm assembly 116 is in the first position 118, and the second radius R2, when the lever arm assembly 116 is in the second position 120). As this ratio increases or decreases, the mechanical advantage provided by the lever arm assembly increases or decreases, respectively.

In the subject embodiment, the lever arm radius R0 may be between 30 and 60 mm, between 40 and 50 mm, and preferably about 45 mm. The first radius R1 of the cable cam surface 162 may be between 6 and 14 mm, between 8 and 12 mm, and preferably about 10 mm. The second radius R2 of the cable cam surface 162 may be between 8 and 16 mm, between 10 and 14 mm, and preferably about 12 mm. Accordingly, in the subject embodiment, the lever arm assembly 116 provides a variable mechanical advantage. At the first radius, the lever arm assembly 116 provides a mechanical advantage M1 that is approximately 4.5 (i.e., 45/10). At the second radius, the lever arm assembly 116 provides a mechanical advantage M2 that is approximately 3.75 (i.e., 45/12). The degree of variation in the variable mechanical advantage can be estimated as M2/M1, which equates to about 0.83 (3.75/4.5) for the preferred embodiment. Accordingly, the mechanical advantage provided by the lever arm assembly 116 decreases by about 20% in the preferred embodiment, as the lever arm assembly 116 moves from the first position 118 to the second position 120.

Decreasing mechanical advantage can be advantageous when using the control device 108 to actuate a mechanism that has a high initial resistance to being actuated but, once actuation begins, has a low ongoing resistance. Dropper seat posts commonly include internal valves to actuate them. These internal valves can have a high initial resistance to being actuated, but a low ongoing resistance once actuation begins. Accordingly, the preferred embodiment of the control device 108 described above, can be particularly advantageous for use with dropper seat posts. However, it will be appreciated that the control device 108 described herein may also be used with other mechanisms for bicycles and is not limited to use with dropper seat posts.

Although the control device 108 has been shown and described herein as comprising the bearing 122, the bearing bolt 124, the spring 126, and the barrel adjuster 128, it will be appreciated that in other embodiments one or more of these elements may be omitted. For example, in some embodiments, the lever arm assembly 116 may be directly coupled to the frame 114, such that the bearing 122 and the bearing bolt 124 are omitted. In some embodiments, the spring 126 may be omitted and the user of the bicycle may manually return the lever arm assembly 116 from the second position 120 to the first position 118, or tension in the actuation cable 112 may naturally bias the lever arm assembly 116 toward the second position 120. In some embodiments, the spring 126 may be integrally formed with at least one of the frame 114 and the lever arm assembly 116. In some embodiments, the barrel adjuster 128 may be omitted, in such embodiments the threaded barrel adjuster hole 138 in the lever arm 146 may also be omitted or may be replaced by an actuation cable guide hole in the lever arm 146.

Although the lever pad 148 and the lever arm 146 have been shown and described as separate elements herein, which are coupled together in the lever arm assembly 116 by pressably inserting the lever pad 148 into the pad opening 170 of the lever arm 146, it will be appreciated that in other embodiments the lever pad 148 may be omitted or may only be provided on the user facing side of the lever arm assembly 116. In such embodiments, the cable catch 152 may be integrally formed with lever arm 146. For example, the cable catch 152 may be formed in the rear side of the lever arm 146. In other such embodiments, the cable catch 152 may be a separate element that is removably coupled to the rear side of the lever arm 146.

Although the cable lock 150 has been shown and described herein as comprising the cable bolt 186 and the cable washer 188, it will be appreciated that in other embodiment the cable washer 188 may be omitted or may be integrally formed with the cable bolt 186. In such embodiments, the cable bolt 186 may directly oppose the cable clamping surface 168 of the lever arm 146, and the actuation cable 112 may be clamped between the cable bolt 186 and the cable clamping surface 168 to fix the actuation cable 112 to the lever arm 146.

Although the head 204 of the lever pad 148 has been shown and described herein as being compressed in a vertical direction by moving the first inner surface 212 toward the second inner surface 214, when securing or removing the lever pad 148 from the lever arm 146, it will be appreciated that in other embodiments the head 204 can be compressed in other directions, such as in a horizontal direction or in both horizontal and vertical directions. In such embodiments, the first inner surface 212 and the second inner surface 214 may be oriented in a different direction than shown herein. For example, the first inner surface and the second inner surface may be oriented in a vertical direction, so that the head 204 can be readily compressed in a horizontal direction to pass though the pad opening 170 in the lever arm 146.

Although the cable catch 152 has been shown and described herein as being provided in the head 204 of the lever pad 148 and extending into the neck 202, in other embodiments the cable catch 152 may only be provided in the head 204.

Although the cable catch 152 has been shown and described herein as comprising a recess 210 and a tip concealing region 218, in other embodiments the cable catch may comprise only the recess, or only the tip concealing portion. For example, in some embodiments, the tip concealing region 218 may be omitted and the recess may extend all the way through the cable catch, along the cable path. In other embodiments, the recess 210 may be omitted and the tip concealing region may extend all the way through the cable catch, such that the first end 232 of the cavity 230 of the tip concealing region is located at an end of the cable catch near the cable lock 150.

Although the cable path 216 has been herein as generally extending in a straight, lateral direction of the lever arm, it will be appreciated that in other embodiments the cable path may be curved. In some embodiments, the cable path may initially extend laterally in an outboard direction away from the cable lock 150 and then curve inwardly. In such embodiments, the terminal end 234 of the cavity 230 of the tip concealing region 218 may be disposed inboard of the first end 232 of the cavity 230.

Although the control device 108 has been shown and described herein as being coupled to the bicycle by the control mount 106, in other embodiments the control mount 106 may be omitted and the control device 108 may be mounted directly to the bicycle, such as directly to the handlebar of the bicycle.

What is claimed is:

1. A control device for an actuation cable on a bicycle, the control device comprising:
   a frame for securing the control device to the bicycle; and
   a lever arm assembly movably coupled to the frame and moveable between a first position and a second position, the lever arm assembly defining a cable path configured to guide the actuation cable and comprising:
   a lever arm movably coupled to the frame;
   a cable lock for fixing the actuation cable to the lever arm, the cable lock demarcating a working segment of the actuation cable from a tail of the actuation cable when the actuation cable is fixed to the lever arm; and
   a cable catch configured to removably retain at least a portion of the tail of the actuation cable and so that the actuation cable follows the cable path when fixed to the lever arm and received in the cable catch, and wherein the cable catch comprises a recess that extends along an axial direction of the cable path and a tip concealing region that is located after the recess along the cable path and comprises an axially extending cavity having a first end that is adjacent the recess and that is at least partially bounded by a base portion and a cover portion that is rearwardly spaced apart from base portion in the depthwise direction and overlies the base portion so that the cavity is configured to slidably receive, in the axial direction, a distal tip of the tail of the actuation cable so that the distal tip is disposed between the base portion and the cover portion, wherein the cover portion comprises a tip shield that is positioned to at least partially cover the distal tip of the tail of the actuation cable in the depthwise direction when received in the tip concealing region thereby inhibiting contact between a user and the distal tip and inhibiting removal of the distal tip from the tip concealing region in the depthwise direction.

2. The control device of claim 1, wherein the lever arm assembly comprises a user facing side and a rear side opposite the user facing side, and wherein the cable catch is located on the rear side of the lever arm assembly.

3. The control device of claim 2, wherein the user facing side comprises a pressing face positioned so as to be pressable by a user when the control device is secured to the bicycle to move the lever arm assembly from the first position toward the second position, the cable catch being optionally located directly opposite the pressing face and within a projection of an area of the pressing face in a rearward direction.

4. The control device of claim 1, wherein the recess is a slot that is configured to pressably receive the tail of the actuation cable in a depthwise direction that is generally perpendicular to the axial direction of the cable path, the slot comprising a base, opposing first and second inner surfaces extending rearwardly from the base and an open side to receive the tail of the actuation cable in the depthwise direction so that the tail of the actuation cable is positionable between and engaged by the opposing first and second inner surfaces.

5. The control device of claim 1, wherein the axially extending cavity comprises a terminal end that is axially spaced from the first end along the cable path.

6. The control device of claim 1, wherein the cable catch is integrally formed with the lever arm.

7. The control device of claim 1, wherein the terminal end of the cavity is at least one of: i) at least partially bounded by the base portion and the cover portion and the lever arm, and ii) disposed inboard of the first end of the cavity.

8. A control device for an actuation cable on a bicycle, the control device comprising:
   a frame for securing the control device to the bicycle; and
   a lever arm assembly movably coupled to the frame and moveable between a first position and a second position, the lever arm assembly comprising:
   a lever arm movably coupled to the frame;
   a cable lock for fixing the actuation cable to the lever arm, the cable lock demarcating a working segment of the actuation cable from a tail of the actuation cable when the actuation cable is fixed to the lever arm; and
   a cable catch configured to removably retain at least a portion of the tail of the actuation cable; and
   a lever pad that includes a body, a neck, and a head, wherein the neck extends through a pad opening in the lever arm, wherein the body and the head securely extend from opposite ends of the neck and are wider than the pad opening to secure the lever pad to the lever arm, and wherein the head is positioned on the rearward side of the pad opening and comprises the cable catch.

9. The control device of claim 8, wherein the head is formed from a resiliently compressible material and is compressible in at least one direction such that the head can be compressed by moving a first inner surface of the cable catch toward a second inner surface of the cable catch to be pressably inserted through the pad opening when securing the lever pad to the lever arm and in order to remove the lever pad from the lever arm, and wherein when the tail of the actuation cable is received within the cable catch the tail is disposed between the first inner surface and the second inner surface thereby resisting compression of the head and inhibiting removal of the head through the pad opening.

10. The control device of claim 8, wherein the cable catch extends into the neck of the lever pad.

11. The control device of claim 8, wherein the cable catch allows access to the tail of the actuation cable when received therein, to permit selective removal of the tail from the cable catch without disassembling the lever arm assembly.

12. The control device of claim 8, wherein the cable catch is spaced apart from the cable lock.

13. The control device of claim 8, wherein the cable catch is integrally formed with the head.

14. The control device of claim 8, wherein the lever pad is removable from the a lever arm and wherein the cable catch is removable from the lever arm with the lever pad.

15. A lever pad for securing to a lever arm of a control device, the lever pad comprising:
- a neck sized to extend through a pad opening in the lever arm;
- a body that is wider than the neck and securely extends from a pressing end of the neck and comprises an outward facing pressing face configured to be positioned on a user facing side of the lever arm and pressable by a user when the lever pad is secured to the lever arm;
- a head that is wider than the neck and securely extends from a rear end of the neck, opposite the pressing end and is configured to pass through the pad opening in the lever arm when attaching or detaching the lever pad from the lever arm, the head comprising a cable catch configured to removably receive at least a portion of a tail of an actuation cable.

16. The lever pad of claim 15, wherein the cable catch defines a cable path, which the tail of the actuation cable follows when received in the cable catch, and wherein the cable catch comprises a recess that extends along an axial direction of the cable path and is configured to pressably receive the tail of the actuation cable in a depthwise direction that is generally perpendicular to the axial direction of the cable path.

17. The lever pad of claim 16, wherein the recess is a slot comprising a base, opposing first and second inner surfaces extending from the base and an open side to receive the tail of the actuation cable in the depthwise direction so that the tail of the actuation cable is positionable between and engaged by the opposing first and second surfaces.

18. The lever pad of claim 17, wherein at least the head and the cable catch are formed from a resiliently deformable material so that a width of the head is compressible by moving the first inner surface of the slot toward the second inner surface of the slot such that the head and the cable catch can be pressably inserted through the pad opening when securing the lever pad to the control device, and wherein the cable catch is configured so that the tail of the actuation cable resists compression of the cable catch by contacting at least one of the first inner surface and second inner surface of the slot, when received therein, thereby resisting compression of the head to inhibit removal of the lever pad from the control device.

19. The lever pad of claim 16, wherein the cable catch further comprises a tip concealing region that is located after the recess along the cable path and comprises an axially extending cavity having a first end that is adjacent the recess and that is at least partially bounded by a base portion and a cover portion that is rearwardly spaced apart from base portion in the depthwise direction and overlies the base portion so that the cavity is configured to slidably receive, in the axial direction, a distal tip of the tail of the actuation cable so that the distal tip is disposed between the base portion and the cover portion, and wherein the cover portion comprises a tip shield that is positioned to at least partially cover the distal tip of the tail of the actuation cable in the depthwise direction when received in the tip concealing region thereby inhibiting contact between a user and the distal tip and inhibiting removal of the distal tip from the tip concealing region in the depthwise direction.

20. The lever pad of claim 15, wherein the cable catch is integrally formed with the head of the lever pad.

* * * * *